(12) United States Patent
Lamm et al.

(10) Patent No.: US 8,462,699 B2
(45) Date of Patent: Jun. 11, 2013

(54) ADMISSION CONTROL OF EMERGENCY CONNECTIONS

(75) Inventors: Anders Lamm, Mölndal (SE); Magnus Johansson, Göteborg (SE)

(73) Assignee: Unwired Planet, LLC, Reno, NV (US)

( * ) Notice: Subject to any disclaimer, the term of this patent is extended or adjusted under 35 U.S.C. 154(b) by 481 days.

(21) Appl. No.: 12/674,978

(22) PCT Filed: Aug. 24, 2007

(86) PCT No.: PCT/EP2007/058801
§ 371 (c)(1),
(2), (4) Date: Feb. 24, 2010

(87) PCT Pub. No.: WO2009/026953
PCT Pub. Date: Mar. 5, 2009

(65) Prior Publication Data
US 2011/0261791 A1    Oct. 27, 2011

(51) Int. Cl.
*H04W 4/00* (2009.01)

(52) U.S. Cl.
USPC .......................................................... 370/328

(58) Field of Classification Search
USPC ................. 370/229, 328, 335, 338, 342, 468
See application file for complete search history.

(56) References Cited

U.S. PATENT DOCUMENTS

| | | | |
|---|---|---|---|
| 6,292,542 B1 * | 9/2001 | Bilder | 379/45 |
| 2005/0111630 A1 * | 5/2005 | Potorny et al. | 379/45 |
| 2007/0195818 A1 * | 8/2007 | Stephenson et al. | 370/468 |
| 2008/0101313 A1 * | 5/2008 | Choi et al. | 370/342 |

* cited by examiner

*Primary Examiner* — Raj Jain
(74) *Attorney, Agent, or Firm* — Nixon & Vanderhye P.C.

(57) ABSTRACT

The present invention relates to a solution for handling emergency or prioritized communication in a wireless communication network during negotiation of access to the wireless communication network from a mobile station using dedicated emergency multiple-access sequences which are also used as communication division codes in communication with a base station of the network.

11 Claims, 5 Drawing Sheets

ADMISSION CONTROL OF EMERGENCY CONNECTIONS

TECHNICAL FIELD

The present invention relates to emergency or prioritized communication in a telecommunications network and in particular to setting up a communication link for emergency or prioritized communication.

BACKGROUND OF THE INVENTION

The setup of traffic connections for the air interface in a telecom system is traditionally handled by a specific node BSC for GSM, RNC for UMTS, and ASN-GW for an IEEE802.16/WiMAX network. The setup of a service is typically requested by a mobile station (MS) and signaled to an application server in the core network.

However in a loaded network, it may be difficult for the MS to get access to air interface resources even to request the setup of a service. In case the service is needed for emergency purposes, i.e. 911 there is a strong wish to be able to prioritize this request and minimize the latency for setup of such services.

The IEEE802.16 has support for different QoS, which can have different priority settings. However before a setup of a service is possible to make the MS must be authenticated and admitted to the network.

Also as IEEE 802.16 is an OFDMA based system where all air interface resources are shared between users a mobile station (MS) may encounter problems to be granted bandwidth to request the setup of a service if the air interface is fully utilized and as there today exist no possibility to differentiate different users during initial ranging or bandwidth request.

SUMMARY OF THE INVENTION

It is therefore an object of the present invention to remedy at least some of the problems relating to known solutions. This is provided in a number of aspects in which a first is a method of handling emergency communication between a mobile station, MS, and a base station, BS, comprising the steps of:
  initiating an emergency communication link;
  obtaining specific emergency communication establishment sequences; using the specific emergency communication establishment sequences during negotiation of access to the BS;
  wherein the sequences are also used as communication division codes.

Specific CDMA codes may be used to indicate emergency access.

The MS may send a second indication of emergency access in an identification message.

Specific random access preamble sequences may be used to indicate emergency access.

The method may further comprise a step of receiving emergency sequences from the BS.

The method may further comprise a step of reading stored pre set emergency sequences in the MS.

The step of obtaining emergency sequences may comprise a step of choosing the sequence randomly from a set of available emergency sequences.

The step of using the sequences during negotiation may be performed during initial access establishment and/or during negotiation during bandwidth establishment.

Another aspect of the present invention, a mobile station for a wireless communication network is provided, comprising:
  an transceiver for wireless communication with a base station, i.e. BS;
  a processor arranged to execute functions for:
    initiating an emergency communication link;
    obtaining specific emergency communication establishment sequences;
    using the specific emergency communication establishment sequences during negotiation of access to the BS;
  wherein the sequences are also used as communication division codes.

Yet another aspect of the present invention, a base station is provided for wireless communication with a mobile Station, i.e. MS, comprising means for detecting communication establishment sequences, means for identifying specific emergency sequences from the establishment sequences, and means for handling emergency communication, wherein the sequences are also used as communication division codes.

Still another aspect of the present invention, a computer program is provided for a mobile station, i.e. MS, comprising instruction sets for:
  controlling wireless communication with a base station, i.e. BS;
  initiating an emergency communication link;
  obtaining specific emergency communication establishment sequences;
  using the specific emergency communication establishment sequences during negotiation of access to the BS;
  wherein the sequences are also used as communication division codes.

Usage of standardized/specific multiple-access sequences only allowed for emergency purposes are proposed to ensure priority of emergency setups.

A specific parameter is suggested to be included for a number of call management messages for fast detection of emergency calls and thus give the base station (system) the possibility for prioritization of the requested traffic during admission control to the system.

Handling of emergency calls are enhanced as the probability of successful setup is increased, which is very much desired in a telecommunication system.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Figure 1:
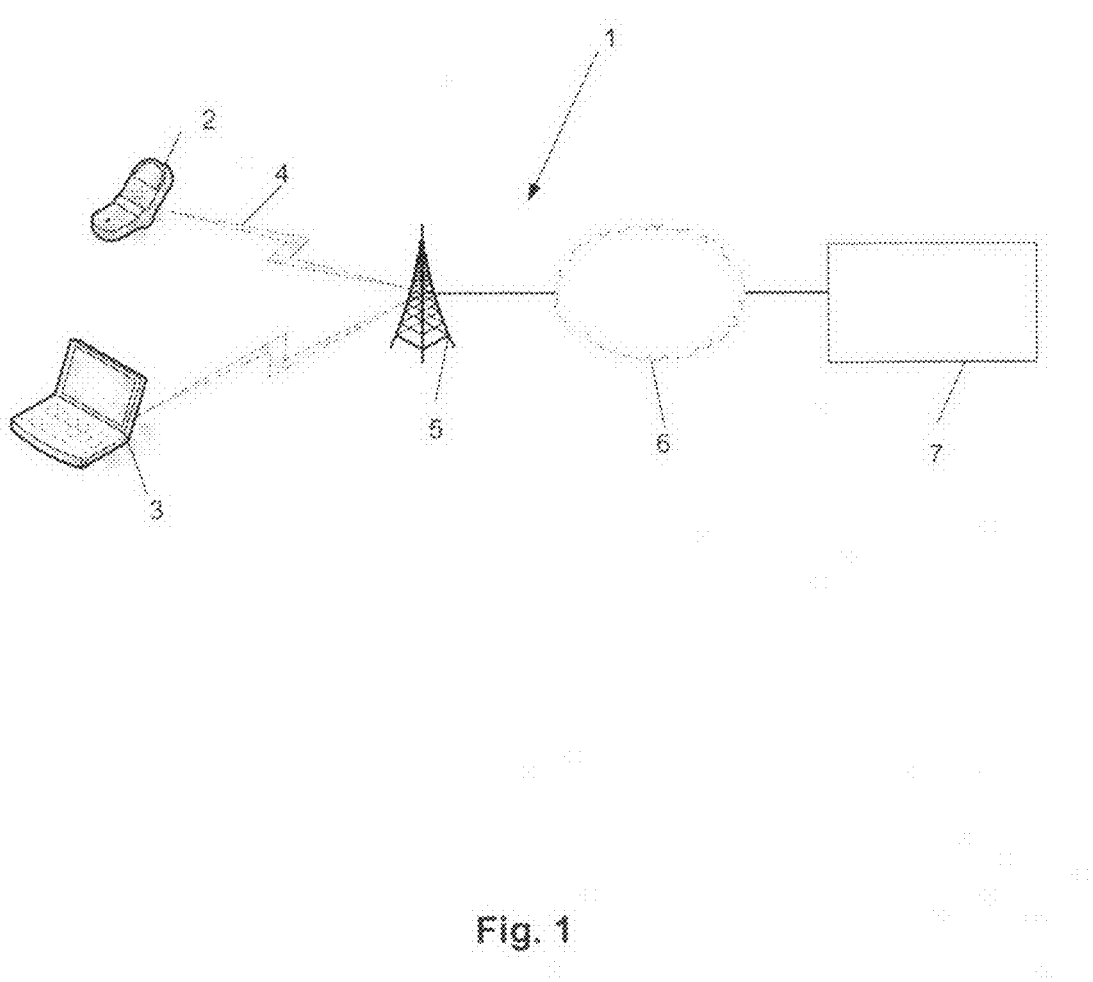
FIG. 1 illustrates schematically a network according to the present invention.

In FIG. 1 reference numeral 1 generally indicate a network configuration according to the present invention, comprising a base station BS) 5 or similar network access gateway for accessing from a mobile station (MS) (which can be any type of wireless terminal, including but not limited to, e.g. a mobile phone, laptop, PDA (Personal Digital Assistant), security appliance, and so on) 2, 3 to a communication network 6. The MS communicates wirelessly 4 with the BS 5 using any suitable protocol and radio link. The present invention addresses the problem when an MS tries to connect to a communication network under certain circumstances where there is a need to increase the probability to actually get a connection: for instance when there is an emergency situation and there is a need to communicate with an emergency organization 7 (e.g. police, fire brigade, and medical help), connection of alarm equipment, and/or surveillance equipment to a central receiving facility 7. These circumstances will be discussed further in this document.

The wireless link between the MS and the BS may be of any suitable type involving some means for registration of the MS, including but not limited to any version of IEEE 802.11, 802.15, 802.16, 802.20, and 802.22 series of communication standards and variations thereof (e.g. WiFi, WiMAX, and Wibro), LTE (Long term evolution) in 3GPP, or similar communication systems. WiMAX has means for registering the MS using a ranging function at early stages of connection establishment and in that process using CDMA codes for random access and in LTE there is a Random Access (RA) preamble/response function used in establishment of the MS. In WiMAX specific ranging CDMA codes may be used for alerting the network about the emergency and/or prioritized link and in LTE specific RA preamble sequences may have corresponding function. CDMA codes in WiMAX and preamble sequences in LTE are two examples of multiple-access sequences. These multiple-access sequences may be orthogonal or non-orthogonal as understood by the skilled person.

Multiple-access sequences are used to distinguish communication links from each other when all users within a communication cell communicate on the same frequency range and encode information to be transmitted with a pseudorandom digital sequence unique for each user in the cell (or unique for each thread set up; a user may have several threads open at the same time depending on communication configuration)

It should be noted that the communication link between the BS and the network may be of any suitable kind including either a wired or wireless link. The link may use any suitable protocol depending on type and level of layer (e.g. as indicated by the OSI model) as understood by the person skilled in the art.

The BS may be alerted about the level of emergency or level of priority desired using different ways depending on type of connection, type of communication protocol, and level of connection already established:

1. If the MS has not been connected yet, establishment sequences specifically agreed upon as emergency sequences may be used.
2. If the MS is connected but has not been granted bandwidth it may also use emergency sequences.
3. If connection and bandwidth has been negotiated about, information elements in call management messages may be used to alert the BS about the emergency connection.

Figure 2:
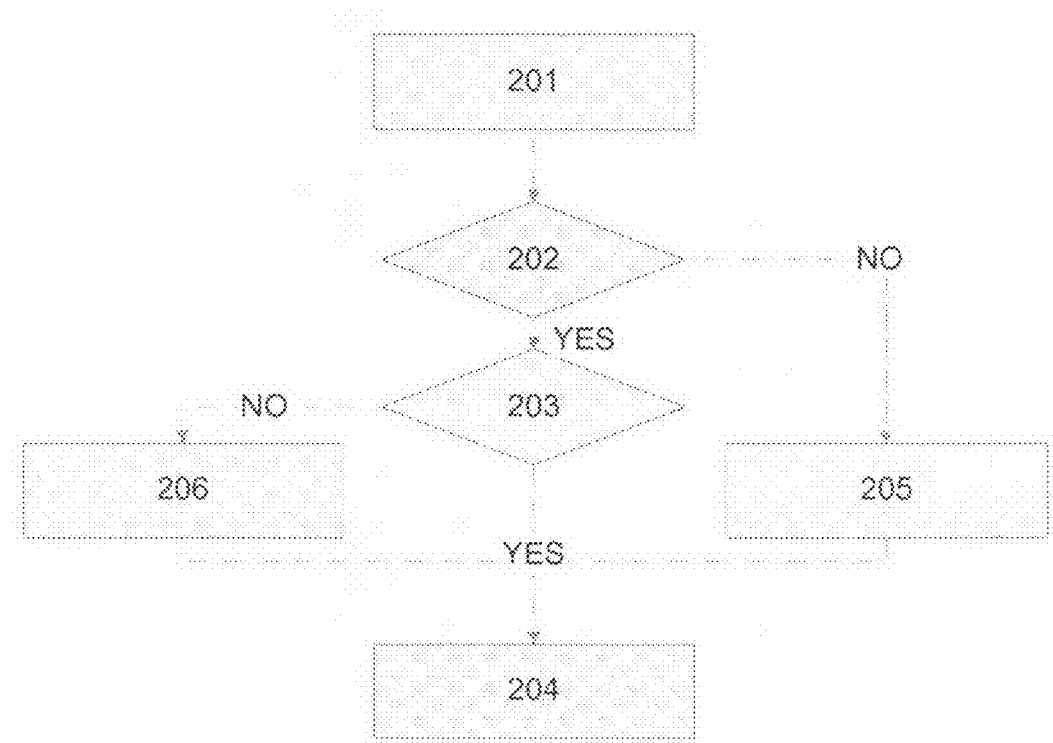
FIG. 2 illustrates schematically in a block diagram a flow-chart of a method according to the present invention.

An overall flowchart for handling of emergency calls according to the present invention is shown in FIG. 2:
201. A decision to connect to a service is taken in first step.
202. It is checked if the MS is registered in the network.
203. If it is registered it is checked if the MS has been granted bandwidth.
204. If it has been granted bandwidth call management messages with emergency information elements are used.
205. If the MS is not registered emergency random access operation is used.
206. If the MS is registered but has not yet been granted bandwidth, emergency bandwidth request is used.

Each of the involved processes is described in the sections below.

MS Requests Setup of Emergency Call

When a user or a machine determines that there is a need for establishing a contact with a receiving service, the MS is initiated to connect to the network 6. Typically this is done by a user dialing 112, 911, or some other emergency call number (depending on type of emergency and/or country; however, the MS may be arranged to be informed about the emergency number to be used where the connection is to be established). However, this could also be a connection from a machine in a system which is capable of automatically determining that a connection is to be started, e.g. a by authorities and operators approved surveillance camera automatically requesting to start sending data or video upon an alarm or triggering event. The receiving service can be an emergency center 7 directing the call to suitable service needed (police, ambulance services and so on) or it may be a security center receiving for instance a distress alarm or burglar alarm signal. Similarly the receiving service may be part of a surveillance system for elderly or handicapped people, e.g. in relation to home care services, where the person under care can contact the home care system for general help or help in a distress situation. There are today many solutions where an elderly or handicapped person has a personal alarm in the form of an arm wrist device with a distress call button. This arm wrist device may be arranged to communicate with a distress call center using a communication protocol compatible with the present invention. Similarly, surveillance cameras and similar devices may be arranged to use a communication protocol compatible with the present invention and arranged to transmit images to a central storage or handling center if a triggering event has occurred, for instance a motion detection event (internally in the camera as a software detector using the images or an external dedicated motion detector).

When pushing the call setup button or initiating the connection in any other suitable manner, the MS will start to request the setup of a transport connection or activate a pre-setup connection to carry the requested service.

The MS can be in different states and will perform different operations depending on its current state in the system:

Normal/active registered in the system with active services.

Normal/active registered in the system with no active services

Idle and not registered or even belonging to the system. Idle in this context is interpreted as not connected to the current BS. The MS may be registered in a core network (or ASN-GW in the WiMAX case).

MS is Registered in the System and has Granted UL Bandwidth.

This is a typical case if the terminal or device already is active performing other tasks, such as transferring data files etc. It may then use the already granted UL bandwidth for the request of an additional service for the emergency purpose.

In the IEEE802.16 this is typically done by sending a dynamic service flow addition request message (DSA-REQ). In this message a number of parameters are set among these are QoS parameter set type, scheduling service type and traffic priority. Depending on the previous authentication of the user the operator may allow/set these parameters differently.

In the present invention a generic parameter (e.g. a TLV-coded information element in the IEEE802.16 standard), is added to control communication, which may be optionally included to call management messages indicating that these are emergency related.

Examples of IEEE802.16 messages where an emergency parameter have benefit are:
1. DSA-REQ/RSP
2. DSC-REQ/RSP The BS (system) may also use this information for prioritizing of this connection for further data transfer, i.e. enhancing the probability for the specific communication data to be delivered to the final destination and granting access to the network.

MS is Registered in the System but Need UL Bandwidth.

In this case the MS needs to perform random access in order to request bandwidth (BW). To improve both the probability of a successful request of BW as well as minimize the latency for grant of BW for UL transmission it is proposed to have separate multiple-access sequences allocated for BW-request for emergency purposes.

It may be relevant to add emergency parameters in any subsequent management messages (e.g. DSA-REQ/RSP and DSC-REQ/RSP for IEEE802.16).

MS is not Registered in the System.

In this case the MS is not registered in a system. This can be due to lack of roaming agreement with a system (visited NW) where it has coverage or due to admission control rejection from its own NW (full network). Specified multiple-access sequences also for initial random access will then improve the setup of emergency connections as admission control functionality may be adjusted for this purpose.

The emergency parameter described earlier may be added to additional IEEE802.16 messages used for network entry below:
1. RNG-REQ/RSP
2. SBC-REQ/RSP
3. PKM-REQ/RSP
4. REG-REQ/RSP
5. DSA-REQ/RSP In this case authentication processes may be simplified or omitted and the MS is allowed to enter the system.

Static or Dynamic Information Transfer of Emergency Sequences.

Two methods for determining specific multiple-access sequences for use are proposed.
1. Static specification by reserving a limited number of multiple-access sequences in the standard. This method is very simple and ensures simple interoperability between different manufacturers and system vendors. The multiple-access sequences are then known to the MS and stored in a memory of the MS.
2. Dynamic specification by broadcast information. Two new groups of multiple-access sequences for emergency initial random access and emergency BW request are added to the specification and broadcasted in a similar way as CDMA codes for initial ranging, BW request, periodic ranging, and handover are signaled today for IEEE802.16.

By this method it is possible for the system to increase the number of multiple-access sequences for emergency purposes dynamically so that the case when many MSs (wireless terminals, cameras, etc) need access to the system simultaneously may be taken care of without the collision probability being higher for emergency calls than for normal calls.

The system may by this method even be solely dedicated for authority devices for public safety purposes as no multiple-access sequences for normal operation are sent.

Figure 3:
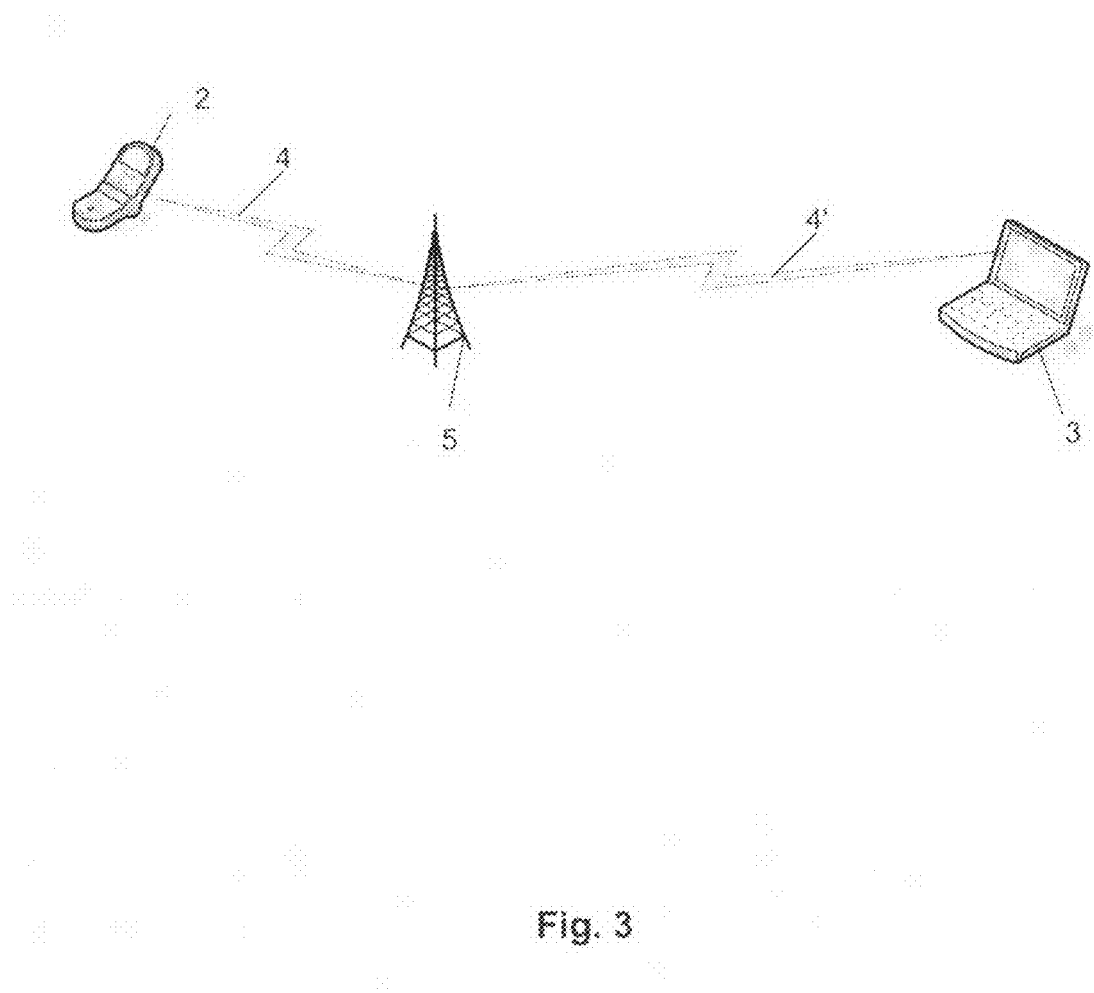
FIG. 3 illustrates schematically a situation for two mobile stations connecting simultaneously to a base station according to the present invention.

The probability of successful reception is increased as the collision risk is decreased. FIG. 3 illustrates this situation; two mobile stations 2, 3 simultaneously try to connect to a common base station 5. Collision risk of UL BW request ranging can be reduced if dedicated multiple-access sequences are used solely for emergency purposes. For instance, if a first MS (A) 2 need to make an emergency BW request it may use a sequence 4 different from a second MS (B) 3 sequence 4' used for regular connection purposes. The probability for both MS A and MS B is in need of an emergency connection is low. However, in order to reduce the problem of two MS doing emergency connection at the same time, each MS may choose randomly an emergency sequence from a fixed set of available emergency sequences. This would reduce the risk of two MS at the same cell using the same emergency sequence and thus reduce the risk of collision. This may be used in any of the situations as described in this document.

Figure 4:
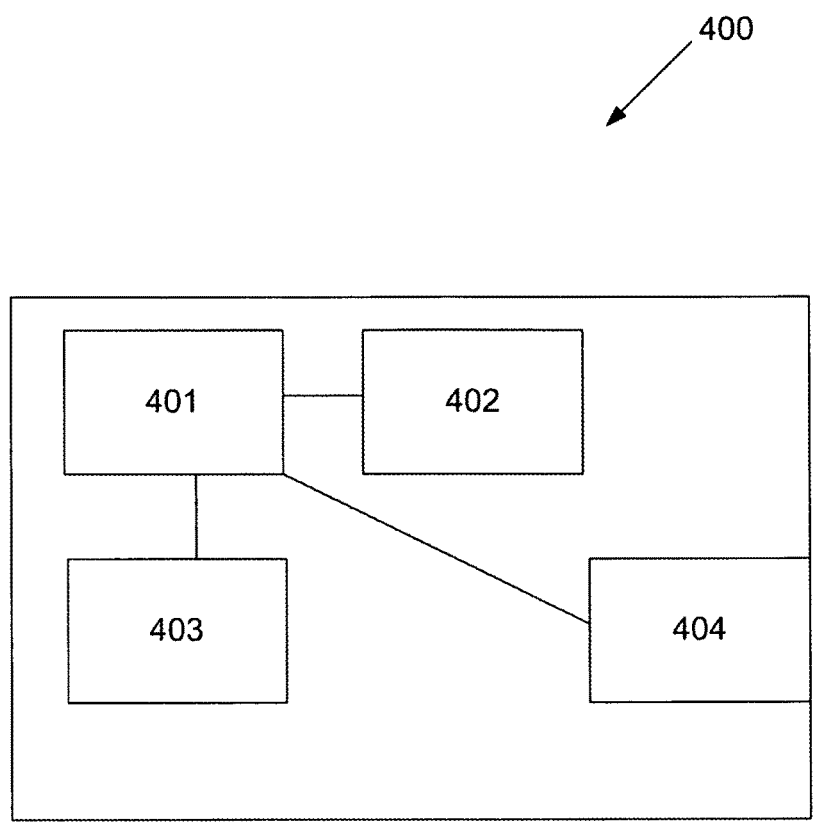
FIG. 4 illustrates schematically in a block diagram a mobile device according to the present invention.

The present invention is used in connecting mobile stations 2, 3 during emergency or other prioritized events. Such a mobile station 400 is shown in FIG. 4. The solution may be implemented in software run in a processing unit 401 and stored in a memory 402. Furthermore, the mobile station may comprise an interface 403 for connecting the processing unit 401 with other components of the mobile station as understood by the person skilled in the art. Furthermore, the mobile station comprises a communication interface 404 for wireless communication with the BS 5. The processing unit 401 may comprise any suitable computational unit such as but mot limited to a microprocessor, FPGA (Field Programmable Gate Array), ASIC (Application Specific Integrated Circuit), or similar units. The mobile station comprises at least one memory 402 of volatile and/or non-volatile type. The memory may be for instance a RAM, DRAM, ROM, EEPROM, Flash memory, hard disk, and so on as understood by the skilled person. The communication interface may be any suitable as discussed earlier using a code division protocol.

Figure 5:
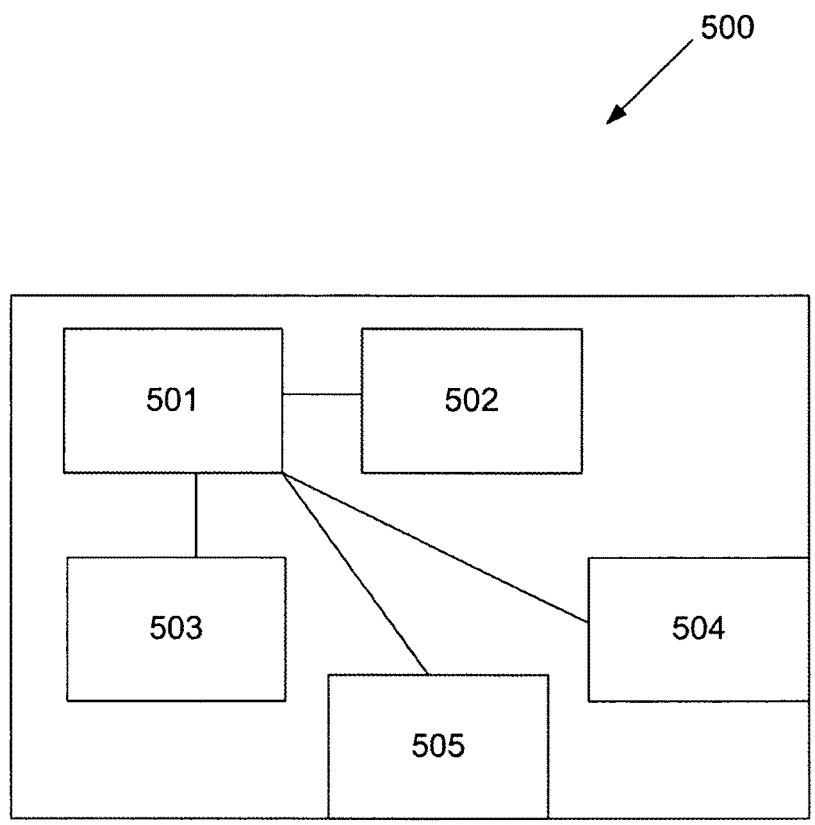
FIG. 5 illustrates schematically in a block diagram an infrastructure device according to the present invention.

In the solution, the BS device 5 has functionality for detecting and understanding these emergency or priority multiple-access sequences. Such a device 500 is shown in FIG. 5. The device 500 comprises also a processing unit 501, at least one memory 502, and an interconnection interface 503 for connecting to other components (not shown) of the BS 5. Furthermore, the device 500 may comprise a downlink communication interface 504 and an uplink communication interface 505. The downlink communication interface is arranged to communicate with the mobile stations (directly or indirectly using further downstream infrastructure devices (not shown)) and the uplink interface 505 is arranged to communicate with the communication network. The downlink and uplink communication interfaces may be built into the same physical interface in some application configurations.

It should be noted that with the term base station is meant an entity that receives or transmits wireless communication between wireless terminals and a communication network. This may include for instance a base station in cellular mobile phone networks, an access point or gateway in a Wireless Local Area Network (WLAN), or similar network access gateway devices.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, and that several "means", "units" or "devices" may be represented by the same item of hardware, and that at least part of the invention may be implemented in either hardware or software.

The above mentioned and described embodiments are only given as examples and should not be limiting to the present invention. Other solutions, uses, objectives, and functions within the scope of the invention as claimed in the below described patent claims should be apparent for the person skilled in the art.

Definitions and Abbreviations
ASN-GW Access service network gateway
BS Base Station
BSC Base station controller
BW Bandwidth
CDMA Code division multiple access
DSA Dynamic Service flow Addition
DSC Dynamic Service flow Change
IEEE Institute of Electrical and Electronics Engineers
NW Network
OFDMA Orthogonal frequency division multiple access
PKM Privacy Key Management
QoS Quality of service
REG Registration
REQ Request
RNC Radio network controller
RNG Ranging
RSP Response
SBC SS Basic Capabilities
SS Subscriber Station
TLV Type, Length, Value
UL Uplink

The invention claimed is:

1. A method of handling emergency communication between a mobile station (MS) and a base station (BS), comprising the steps of:
   determining, by the MS, that an emergency communication is needed;
   initiating, by the MS, an emergency communication link with the BS;
   if the MS is not registered with the BS:
      obtaining specific emergency communication establishment sequences;
      using the specific emergency communication establishment sequences to negotiate access to the BS and request emergency bandwidth;
   if the MS is registered with the BS, but has not been granted bandwidth:
      using the specific emergency communication establishment sequences to request emergency bandwidth; and
   if the MS is registered with the BS and has been granted bandwidth:
      sending an indication that emergency access is needed in an identification message, and
   wherein the sequences are also used as communication division codes.

2. The method according to claim 1, wherein specific Code Division Multiple Access (COMA) codes are used to indicate emergency access is needed.

3. The method according to claim 1, wherein specific random access preamble sequences are used to indicate emergency access is needed.

4. The method according to claim 1 further comprising a step of receiving emergency sequences from the BS.

5. The method according to claim 1, further comprising a step of reading stored pre-set emergency sequences in the MS.

6. The method according to claim 1, wherein the step of obtaining emergency sequences comprises a step of choosing the sequence randomly from a set of available emergency sequences.

7. The method according to claim 1, wherein the step of using the sequences to negotiate access is performed during initial access establishment.

8. The method according to claim 1, wherein the step of using the sequences to negotiate access is performed during bandwidth establishment.

9. A mobile station (MS) for a wireless communication network, comprising:
   a transceiver for wireless communication with a base station (BS);
   a processor arranged to execute functions for:
      determining that an emergency communication is needed;
      initiating an emergency communication link with the BS;
      if the MS is not registered with the BS:
         obtaining specific emergency communication establishment sequences;
         using the specific emergency communication establishment sequences to negotiate access to the BS and request emergency bandwidth;
      if the MS is registered with the BS, but has not been granted bandwidth:
         using the specific emergency communication establishment sequences to request emergency bandwidth; and
      if the MS is registered with the BS and has been granted bandwidth:
         sending an indication that emergency access is needed in an identification message, and
   wherein the sequences are also used as communication division codes.

10. A base station (BS) for wireless communication with a mobile station (MS) comprising:
    a processor arranged to execute functions for:
       if the MS is not registered with the BS, detecting communication establishment sequences from the MS;
       if the MS is registered with the BS, but the BS has not granted bandwidth, identifying specific emergency sequences from the establishment sequences, the specific emergency sequences used to request emergency bandwidth;
       handling emergency communication; and
       if the MS is registered with the BS and the BS has granted bandwidth, sending a second indication of emergency access in an identification message, wherein the sequences are also used as communication division codes.

11. A non-transitory computer-readable medium for a mobile station (MS) programmed with instruction sets operable when executed by a computer processor of the MS, for:
    controlling wireless communication with a base station (BS);
    determining that an emergency communication is needed;
    initiating an emergency communication link with the BS;
    if the MS is not registered with the BS:
       obtaining specific emergency communication establishment sequences;

using the specific emergency communication establishment sequences to negotiate access to the BS and request emergency bandwidth;
if the MS is registered with the BS, but has not been granted bandwidth:
using the specific emergency communication establishment sequences to request emergency bandwidth; and
if the MS is registered with the BS and has been granted bandwidth:
sending an indication that emergency access is needed in an identification message, and
wherein the sequences are also used as communication division codes.

\* \* \* \* \*

UNITED STATES PATENT AND TRADEMARK OFFICE
CERTIFICATE OF CORRECTION

| | | |
|---|---|---|
| PATENT NO. | : 8,462,699 B2 | Page 1 of 1 |
| APPLICATION NO. | : 12/674978 | |
| DATED | : June 11, 2013 | |
| INVENTOR(S) | : Lamm et al. | |

It is certified that error appears in the above-identified patent and that said Letters Patent is hereby corrected as shown below:

In the Specification

Column 2, line 4, delete "an transceiver" and insert therefor -- a transceiver --

Column 6, line 32, delete "but mot" and insert therefor -- but not --

In the Claims

Column 7, line 61, in Claim 2, delete "(COMA)" and insert therefor -- (CDMA) --

Column 7, Line 66, in Claim 4, delete "claim 1 further" and insert therefor -- claim 1, further --

Signed and Sealed this
Fifteenth Day of October, 2013

Teresa Stanek Rea
*Deputy Director of the United States Patent and Trademark Office*